Nov. 8, 1955   M. L. HOLT ET AL   2,723,012
FRACTIONAL REVOLUTION CLUTCH
Filed Jan. 31, 1952   3 Sheets-Sheet 1
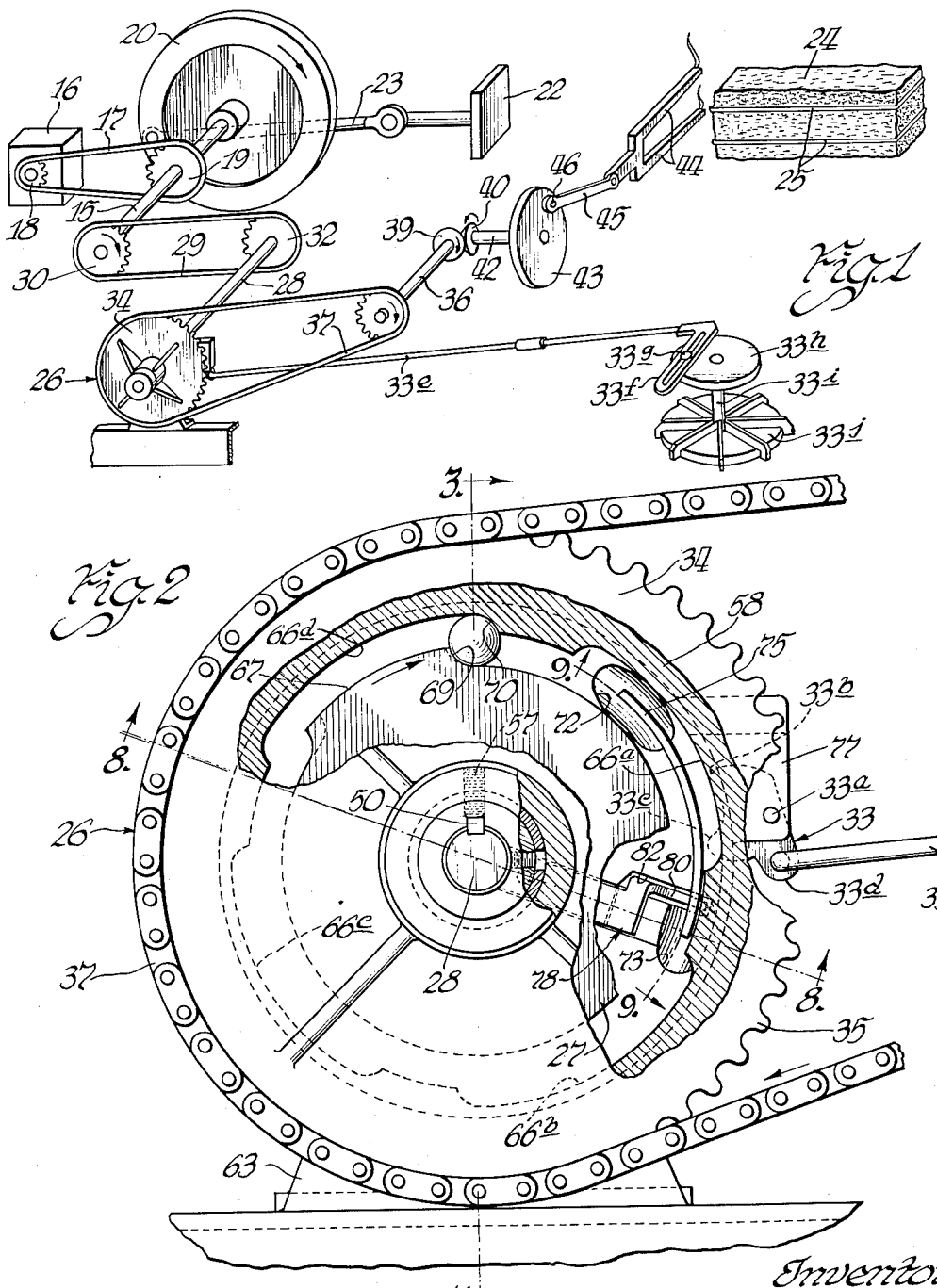
Inventors
Marcus L. Holt
Frank P. Wright
By H. Thrall Brewer
Atty.

Nov. 8, 1955 M. L. HOLT ET AL 2,723,012
FRACTIONAL REVOLUTION CLUTCH
Filed Jan. 31, 1952 3 Sheets-Sheet 2
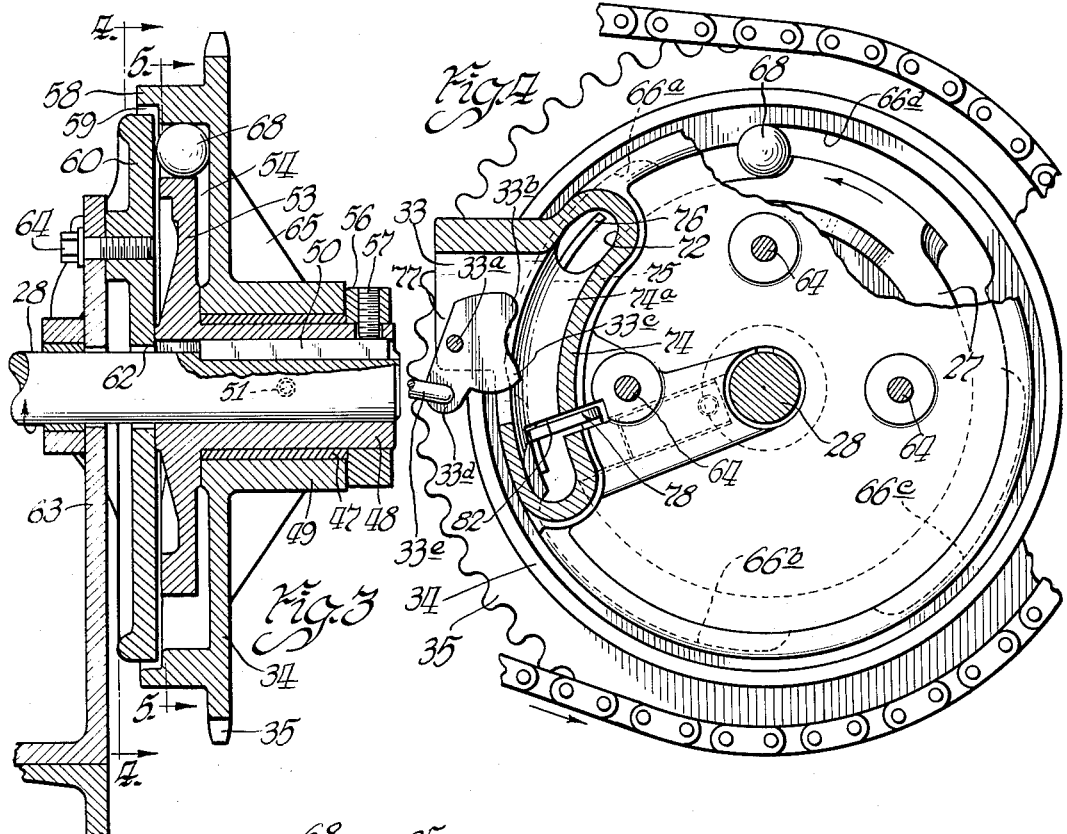
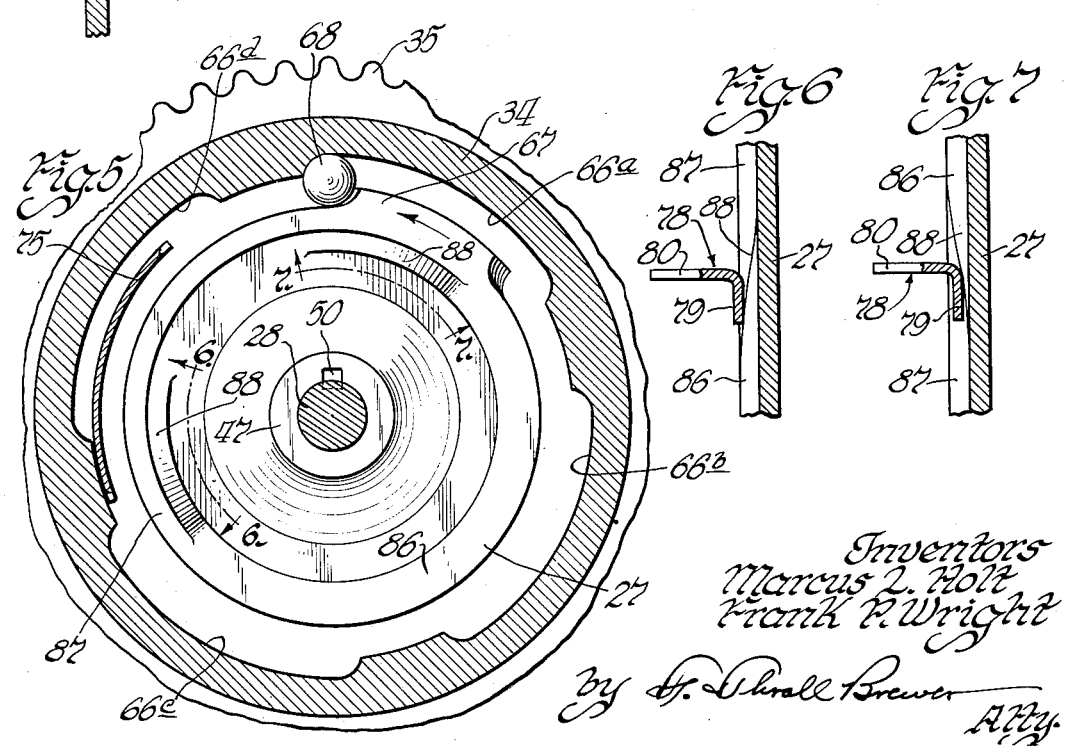
Inventors
Marcus L. Holt
Frank R. Wright
By H. Thrall Brewer
Atty.

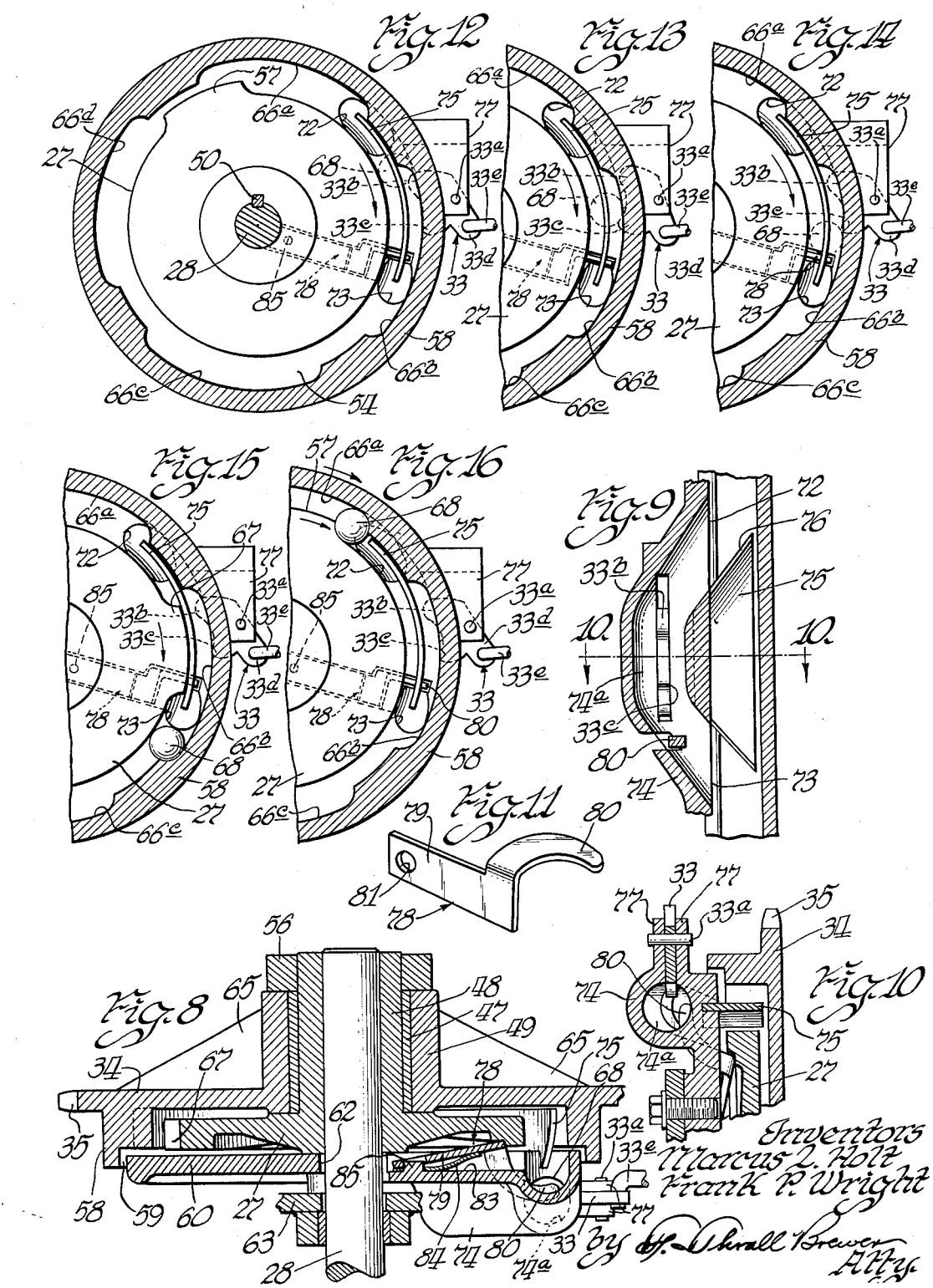

United States Patent Office 2,723,012
Patented Nov. 8, 1955

2,723,012

FRACTIONAL REVOLUTION CLUTCH

Marcus L. Holt, Lookout Mountain, and Frank P. Wright, Chattanooga, Tenn., assignors to Chattanooga Welding & Machine Co., Inc., Chattanooga, Tenn., a corporation of Tennessee Application January 31, 1952, Serial No. 269,264

5 Claims. (Cl. 192—33)

This invention relates to fractional revolution clutches, and more particularly to clutches of a type adapted to provide predetermined fractional revolution and intermittent operations of a driven element at intervals which are preselected in respect to the movements of a driving element and subject to supplementary control.

One of the objects of our invention is to provide a clutch embodying relatively rotatable driving and driven elements constructed and arranged so that an additional element effects a positive driving connection between the driving and driven elements and maintains that driving connection for a predetermined portion of a revolution of the driven element.

Another object of this invention is to provide a clutch of the type referred to and wherein the driving connection between the driving and driven elements becomes effective for initiating motion of the driven element at a predetermined position of the driving element.

Our invention further has within its purview the provision of a clutch of the type described and wherein the periods of clutch operation during which the driven element is actuated by the driving element are subject to the control of an additional and separately actuated control element.

The clutch of this invention has for another of its purposes the provision of an intermediate driving mechanism affording an intermittent driving connection between two parts which each move cyclically, and which clutch serves to effect such cyclic movements in predetermined timed relationship to one another whenever said two parts are brought into simultaneous operation thereby.

Still another object in connection with the aforementioned intermediate driving mechanism is to construct and arrange the aforementioned separately actuated control element so that the element moves away from and back to an original position while causing mechanism to be made ready for operation. Thus the control element is completely self-positioning, and no separate act of adjustment or return to position is required to enable the control element to repeat its controlling function.

A still further object involving the intermediate driving mechanism is to construct and arrange the means for placing the mechanism in operation in timed relation to the parts that it drivingly connects in such a way that said means has a non-positive action, whereby damage to the intermediate driving mechanism is avoided.

Other objects and advantages of the invention will be apparent from the following description and the accompanying drawings in which similar characters of reference indicate similar parts throughout the several views.

Referring to the three sheets of drawings,

Fig. 1 is a diagrammatic view in perspective illustrating an adaptation of the fractional revolution clutch of this invention to a mechanism wherein it is adapted to the control and timing of the movements of one reciprocating member in respect to another;

Fig. 2 is a front elevational view of a preferred embodiment of my fractional revolution clutch drawn to a relatively large scale and having a portion of the outer structure broken away to show details of the internal mechanism;

Fig. 3 is a side sectional view wherein the section is taken substantially on a line 3—3 of Fig. 2 and in the direction indicated by accompanying arrows;

Fig. 4 is a top plan view of the clutch structure shown in Figs. 2 and 3 and has portions broken away to show details of the internal mechanism;

Fig. 5 is a rear elevational view with parts broken away to show details of the structure;

Figs. 6 and 7 are fragmentary sectional views on lines 6—6 and 7—7, respectively, of Fig. 5 and illustrate camming action taking place on the clutch;

Fig. 8 is a fragmentary sectional view taken substantially on a line 8—8 of Fig. 2 and in the direction indicated by arrows;

Fig. 9 is a fragmentary sectional view taken substantially on a line 9—9 of Fig. 2 and in the direction of the arrows;

Fig. 10 is a fragmentary sectional view taken substantially on a line 10—10 of Fig. 9 and in the direction of the arrows;

Fig. 11 is a perspective view of a gate that is an important part of the clutch of the present invention; and Figs. 12, 13, 14, 15 and 16 are front sectional views of the disclosed clutch which illustrate different positions of the operating parts and depict phases of the operation of the clutch mechanism.

Although the fractional revolution clutch herein disclosed is adapted to many uses and may be constructed to provide various fractional portions of a revolution of a driven member during a full revolution of a driving member, the form herein illustrated is adapted, as shown in Fig. 1, to the control of the timing and extent of simultaneous movements of two reciprocating parts of a mechanism. As a practical example, a mechanism of the general nature or type of that shown in Fig. 1 corresponds somewhat to that used in a hay baling press, or the like, wherein tie-feeding needles draw the tying elements around a predetermined quantity of packed hay when that predetermined quanity of hay has been packed and also in timed relationship to the movement of a packing piston, so that the needles are not broken or damaged by contact with the piston.

In the accompanying drawings, an exemplary embodiment of our fractional revolution clutch and a diagrammatic illustration of its adaptation to a timing and control mechanism are shown for illustrative purposes. As depicted in Fig. 1, a main shaft 15 is driven by a prime mover 16, such as an internal combustion engine or a motor, through a flexible driving element 17 carried by suitable sprockets 18 and 19. At one end of the shaft 15, a fly wheel 20 is secured thereto, which fly wheel serves as a crank for effecting reciprocating movements of a ram or piston 22, which piston is connected to a crank pin on the fly wheel through a connecting rod 23.

In the instance of a hay baling mechanism, loose hay is fed into a form and is compacted into a bale 24 by the reciprocating movements of the piston 22. When the bale reaches a predetermined size, it is tied by tying elements, such as strands of twine 25. While some balers require manual placement of the tying elements across the end of the bale, mechanical mechanisms and tying apparatus have been provided, so that the problem confronted is that of providing and maintaining operation of the twine placing needles in timed and synchronized relationship to movements of the bale compressing piston.

As a vital element in effecting the desired timing and synchronized operation of moving parts, we have provided a fractional revolution clutch 26 having a driving member 27 secured to and driven by a shaft 28, which shaft is driven in definitely timed relationship from the main shaft 15 through means such as a flexible driving chain 29 and suitable sprockets 30 and 32 secured to the respective shafts. The disclosed fractional revolution clutch, as will be explained, is constructed and arranged so that its operation is initiated by movements of a trap 33, and thereafter provides a predetermined fractional revolution of a driven member 34 in a definite and timed relationship to a revolution of the driving member 27. The trap 33 is pivoted on a pin 33a and has angularly spaced portions 33b and 33c which successively perform trapping functions. The trap has an ear 33d to which is pivotally connected one end of a rod 33e. A slotted member 33f is fixed to and extends at a substantial angle from the other end of the rod 33e. The slotted member receives a crank pin 33g on a disk 33h, which is secured to a shaft 33i to which a metering wheel 33j is in turn secured. The metering wheel is adapted to engage the hay in the baling chamber and to be rotated by the hay as it moves along the chamber.

As herein depicted, and in the illustrated adaptation, the driven member includes a sprocket 35 from which it drives a shaft 36 through means such as a flexible driving chain 37 and a sprocket 38 on the latter mentioned shaft. Through means such as meshing beveled gears 39 and 40, the shaft 36 drives another shaft 42, upon which a crank disk 43 is mounted. Twine catching needles 44 are mounted for reciprocating movement in a direction transverse to that of the movement of the piston 22, so that they can be moved across the end of the compressed bale and retracted while the piston 22 is being moved away from and only partially back toward the end of the bale. A connecting rod 45 connects the needles 44 to a crank pin 46 on the crank disk 43.

In the exemplary and illustrative adaptation of our invention which is depicted in Fig. 1, it may be observed that the several moving parts are drivingly connected in fixed driving relationship on both sides of the clutch 26, so that relative positions of those parts are not varied by factors such as belt slippage. Furthermore, definite and predetermined gearing relationships are established. For simplicity, and for example, the driving ratio is such that each revolution of the fly wheel 20 (which produces one complete stroke of the piston 22) effects one revolution of the driving member 27 of the clutch 26. The driving ratio on the driven side of the clutch, however, is varied, so that a fractional revolution of the driven member (in the present instance, three-quarters of a revolution) of the driven member produces one complete cycle of movement of the needles 44.

In the disclosed embodiment of Fig. 1, it may be assumed that the accumulation of a predetermined quantity of compressed hay for a bale effects sufficient rotation of the metering wheel 33j for the trap 33 to make a complete oscillation to and from the position of Fig. 12 to initiate the operation of the clutch 26. It is the function of the clutch to time and synchronize the movements of the needles 44 with respect to the relatively continuous movements of the piston 22.

In the clutch structure, as depicted in Figs. 2, 3, 4, 5, and 8 of the drawings, the driving and driven members 27 and 34 respectively are generally circular and are mounted in concentric relationship and for relative rotation by a sleeve bearing 47 secured to a hub 48 on the driving member 27 and journalled in a hub 49 on the driven member 34. The driving member 27 is drivingly secured to the drive shaft 28 by a key 50. Fastening means such as a set screw 51 (Fig. 2) is threaded into the hub 48 of the driving member and abuts the shaft 28 to secure the driving member in a fixed position axially of the shaft.

As shown in Fig. 3, the driving member 27 has a relatively disk-like end portion 53 integrally adjoined to the hub 48. The driven member, on the other hand, has a cavity 54 therein at the end opposite the hub 49, which cavity is of a size and depth to receive the disk-like end portion 53 of the driving member. At the end of the hub 48 of the driving member opposite the disk-like end portions 53 thereof, a collar 56 is secured thereto by fastening means such as a set screw 57, which collar abuts the end of the hub 49 of the driving member opposite the cavity 54 therein to hold the driving and driven members in their assembled relationship. The set screw 57 engages a threaded opening in the collar 56 and passes through an unthreaded opening in the sleeve 48. The end of the set screw abuts the key 50.

Radially, the driving and driven members are spaced from one another, and the driven member 34 has an axial flange 58 thereon which overlies the periphery of the driving member. Additionally, the flange 58 on the driven member has an internal peripheral recess 59 adjacent the cavity 54, which recess is entered by the outer edge of a stationary end cover member 60. The cover member 60 has a central bore 62 therein through which the shaft 28 extends, and is supported adjacent the end surfaces of the driving and driven members 27 and 34 respectively by a stationary support 63 to which that stationary cover member is secured by fastening means, such as cap screws 64. On the outer surface of the driven member 34, opposite the stationary cover member 60, a plurality of integral radial ribs 65 are provided to strengthen that driven member and make it rigid.

Internally of the axial flange 58 on the driven member, a plurality of recesses 66a, 66b, 66c and 66d open inwardly toward the cavity 54 and are spaced peripherally of the driven member from one another. The recesses 66a, 66b, 66c and 66d are equally spaced angularly or peripherally of the driven member, since at each operation of the clutch, the driven member is to be moved through substantially the same fractional portion of a revolution. In the present instance, there are four recesses, because the driven member is to be moved through three-quarters of a revolution at each operation of the clutch. If the driven member were to be moved through two-thirds of a revolution at each operation of the clutch, the number of recesses would be three. It thus follows that the number of recesses for a particular clutch design is equal to the denominator of the fractional portion of a revolution through which the driven member is to be moved at one operation and during a complete revolution of the driven member. As will appear, the disclosed design is such that the minimum angle through which a driven member can be actuated at each operation is practically one-half of a revolution. Compensation for this limitation can be made, however, by selection of the gear ratio utilized between the driven member and the part which is actuated thereby.

The driven member 27 of the disclosed clutch structure has on its periphery a lug or protuberance 67 which projects outwardly in a radial direction and which has a radius from the center of rotation less than the inner radius of the cavity 54 of the driven member. The radius of the rest of the disk-like end portion 53, other than the protuberance or lug 67 is substantially uniform and is such that an intermediate driven element 68, preferably in the form of a metal ball, will fit freely into one of the recesses 66a, 66b, 66c or 66d so as to permit relatively free movement of the driving member 27 relative to the driven member 34 during a major portion of a revolution of the driving member. The intermediate driving member, however, is of a size such that it will be engaged between opposed gripping surfaces 69 and 70 at one end of one of the recesses and at one end of the lug or protuberance, as shown in Fig. 2, to transmit driving force circumferentially of the driving member and from the driving member to the driven member.

In the disclosed structure, the gripping surfaces 69 and 70 are opposed in angular relationship relative to diameters of the respective driving and driven members.

When the intermediate driving element 68 is thus engaged between gripping surfaces at one end of one of the recesses in the driven member and one end of the lug or protuberance on the periphery of the driving member, the driven member is actuated by and with the driving member. During the driving of the driven member, the driving element is retained axially of the clutch between the driven member 34 and the stationary member 60.

In order to provide for actuation of the driven member 34 through only a predetermined fraction of a revolution during each operation of the clutch, we have provided means for diverting the intermediate driving element 68 from its driving position between the driving and driven members 27 and 34 for a preselected fractional portion of a revolution of the driving member. When the intermediate driving element is thus diverted, the driving member rotates freely relative to the driven member.

For effecting the aforementioned diversion of the intermediate driving element 68 from between the driving and driven members during a definite portion of a complete revolution, we have provided vertically spaced openings 72 and 73 in the stationary member 60, which openings are of a size for movement of the intermediate driving element therethrough and which openings are also disposed at a distance from the axis of rotation of the driving and driven members which effects their alignment with the path of travel of the intermediate driving element relative to the stationary member and the space between the surface of the driving member and the opposed surfaces of the recesses in the driven member. The circumferential spacing between the openings 72 and 73 is equal substantially to the portion of one revolution of the driven member during which it is to remain stationary. The stationary member 60 has on its outer side an enlargement 74 which has a passage 74a, the ends of which are the openings 72 and 73. The intermediate driving element 68 can move with relative freedom through this passage from the opening 72 to the opening 73. In the present instance, the enlargement 74 is arcuate in its longitudinal contour. By having the openings 72 and 73 spaced vertically from one another by less than 180° of the circumference of the stationary member 60 and at appropriate positions, the intermediate driving element moves by gravitational force from the opening 72 to and through the opening 73.

Diversion of the intermediate driving element 68 from between the gripping surfaces of the driving and driven members and through the opening 72 is insured by the use of a stationary deflecting element 75 which, in the disclosed structure, comprises an arcuately curved and relatively thin blade secured to the stationary member 60 so as to project between the driving and driven members on the side of the opening 72 remote from the one on which the intermediate driving element approaches the opening while driving the driven element. As depicted in Figs. 4 and 9, the deflecting element 75 has an angularly disposed end surface 76 which projects angularly over the entrance end of the opening 72 to engage the intermediate driving element 68 at the entrance to the opening 72, thereby to deflect it forcibly from between the gripping surfaces and into the opening 72.

Between the openings 72 and 73, the trap 33 extends into the enlargement 74 and the passage 74a therein to provide a movable obstruction for controlling the passage of the intermediate driving element through the enlargement 74 and from the upper to the lower opening. As shown in Figs. 4 and 10, the trap 33 is positioned between closely spaced ears 77 formed as integral extensions of the enlargement 74. The pin 33a which serves as a pivotal mounting for the trap 33 extends through the ears 77 and is secured to one or both of them.

When the trap 33 makes a complete oscillation, that is, moves angularly in one direction from the position of Fig. 12 to that of Fig. 13 and then in the opposite direction from the position of Fig. 13 to that of Fig. 14, which is the original position indicated in Fig. 12, the intermediate driving element 68 will have passed the trap 33 as is indicated by comparison of element 68 in Figs. 12 and 14. In the position of Fig. 12 the element 68 is stopped by the portion 33b of the trap, which portion is in the passage 74a. When the trap is shifted to the position of Fig. 13, the portion 33b withdraws from the passage 74a sufficiently to let the element 68 pass, but now the portion 33c enters the passage 74a to block the element 68. When the trap is shifted to the position of Fig. 14, the portion 33c withdraws from the passage 74a sufficiently to let the element 68 pass. Now, although the element 68 has completely passed the trap 33, the trap is in position to block the element 68 again when it is delivered to the passage 74a through the opening 72. The two spaced trap portions 33b and 33c make it possible to use a complete or maximum movement of the trap for letting the element 68 pass the trap, this movement being a complete oscillation involving return of the trap to its original position. Thus, no separate operation is required to return the trap to its original position. The complete oscillation of the trap is produced by a sufficient rotation of the wheel 33j, caused by movement of hay into the baling chamber by the plunger 22. In the arrangement depicted in Fig. 1, such sufficient rotation of the wheel 33j will be one revolution thereof.

In an application such as that illustratively depicted herein, there is a problem encountered which is in addition to that of having the driven member actuated during only a predetermined fractional portion of a revolution of the driving member. The second problem is one of timing, that is, the prescribed fractional revolution of the driven member effects a predetermined cycle of operation of the parts actuated thereby, and leaves those parts in positions for starting another like cycle of movements. In such an instance, it is apparent that the proper timed relationship of two moving parts, such as the piston 22 and the needles 44 is effected and maintained only by having the driving member start its actuation of the driven member only when the driving member is in a predetermined starting position.

In the structure herein disclosed, the accomplishment of the desired timing is effected by the use of a gate 78 in the passage 74a adjacent the opening 73 for determining the timing of the passage of the intermediate driving element 68 through the lower opening 73 for engagement between the driving and driven members; the gate being moved in timed relationship to the movements of the driving member. The gate is shown by itself in Fig. 11. It comprises a flat shank 79 and a hook 80 which extends from one end of the shank at a substantial angle to the plane of the shank. The shank has a locating opening 81 adjacent the opposite end. As shown in Figs. 2 and 8, the gate hook 80 extends into a generally radial slot 82 formed in the stationary member 60 adjacent the opening 73 so as to cut across the passage 74a. The gate shank 79 is positioned in a generally radial recess 83 formed in the member 60 and rests against a leaf spring 84 which rests against the base of the recess 83. A projection 85 formed on the base of the recess fits in an opening in one end of the spring 83 and in the opening 81 in the gate shank 79 to hold the spring and gate against radial movement and to serve as a pivot about which the gate may have angular movement. Thus, the gate hook may move axially, that is, in the direction of the axis of the shaft 28 to block or unblock the end of the passage 74a adjacent the opening 73. The spring 84 urges the gate 78 to the position of Fig. 8 in which the gate hook 80 blocks the passage 74a.

The gate is shifted against the spring 84 to a non-blocking position by a cam 86 acting against the end of the gate shank 79 from which the gate hook 80 extends. The camming action is illustrated in Figs. 6 and 7. The cam 86 is formed as an inner widened region that forms part of a circular raised portion 87 on one face of the driving member 27 adjacent its periphery. The cam 86 has inclined end portions 88. The arrangement is such that the cam 86 makes the gate 78 clear the opening 73 at the end of the passage 74a during only a portion of the revolution of the driving member.

The cam 86 which opens the gate 78 for passage of the intermediate driving element 68 through the opening 73 is so disposed with respect to the single lug or protuberance 67 on the surface of the driving member 27 that it is impossible for the intermediate driving element to get into a driving position between the driving and driven members twice in one revolution of the driving member, as it might if the diverted travel of the intermediate driving element were unrestricted and uncontrolled. In the disclosed structure, as may be observed, the driving member must travel two complete revolutions for driving the driven member three-quarters of a revolution and again returning to a position for initiating a second three-quarters of a revolution of the driven member. Thus it may be observed that with the disclosed structure, a definitely timed relationship between the movements of actuated parts, such as the piston 22 and needles 44, is maintained irrespective of the timing of the operation initiating movement of the control element 33.

A sequence of the operations of the parts of the disclosed fractional revolution clutch mechanism may be observed by reference to Figs. 12, 13, 14, 15, and 16. In Figs. 12 and 13, the intermediate driving element is in diverted positions out of its driving relationship between the driving and driven members, and is retained in that position by the trap 33. With this relationship, the driving member is free to rotate relative to the driven member, and the driven member remains stationary. As shown in Fig. 14, the trap 33 has shifted to the position of Fig. 13 and then back to its original position of Fig. 12, and the intermediate driving element 68 has fallen to a position in the opening 73, where it is prevented from entering the recess 66b in the driven member by the gate hook 80. However, when the lug or protuberance 67 on the driving member has passed beyond the opening 73 from the position shown in Fig. 8 to the position shown in Fig. 9, the gate hook 80 has been retracted, because the cam 86 has engaged the gate shank 79. Thus the intermediate driving element has moved through the opening 73 into the recess 66b of the driven member. In the latter position of the intermediate driving element, it is engaged by the lug or protuberance 67 during its succeeding movement with the driving member. With engagement between the driving and driven members, as shown in Fig. 10, the driven member moves with the driving member through the predetermined fractional revolution and until the intermediate driving element 68 reaches the opening 72 into which it is deflected by the stationary deflecting element 75. After being deflected into its diverted position, the cycle of operation of the parts of the clutch may be repeated.

It is to be noted that, whereas the gate hook 80 is positively shifted from blocking position to non-blocking position with respect to the passage 74 in the stationary member 60, the shift back to blocking position is impositively produced by the spring 84. Thus the intermediate driving element 68 cannot be pinched and broken by the gate hook 80 as might be the case if the gate were positively returned to blocking position. Of course, the element 68 should not stay at the opening 73 once the gate hook 80 has withdrawn and should have been carried by the driving protuberance 67 around to the vicinity of the opening 72 by the time the gate hook returns to blocking position. However, it may happen occasionally that the element 68 after passing the gate hook 80 will stay at the opening 73 instead of being engaged by the driving protuberance 67 and thus will be in the path of the gate hook as it returns to blocking position.

From the foregoing description and reference to the accompanying drawings, it may be readily appreciated that we have provided a rugged and positively actuated clutch mechanism which is not only adapted to provide movement of a driven member through a predetermined fractional portion of a revolution in response to continuous movement of a driving member, but which is also adapted to the provision of successive fractional revolutions of a driven member while maintaining a timed relationship between those movements of the driven member and the position of the driving member at the start of each succeeding movement of the driven member.

While we have illustrated a preferred embodiment of our invention, many modifications may be made without departing from the spirit of the invention, and we do not wish to be limited to the precise details of construction set forth, but desire to avail ourselves of all changes within the scope of the appended claims.

Having thus described our invention, what we claim as new and desire to secure by Letters Patent of the United States is:

1. In a fractional revolution clutch, the combination comprising driving and driven members mounted in adjacent and concentric relationship for rotation relative to one another, said members having peripheral surface portions in spaced relationship and provided with opposed gripping surfaces having angular dispositions to radii of the members, an intermediate driving element of a size to fit between and be gripped by the gripping surfaces for transmitting driving force from the driving to the driven member while being carried through an arcuate path by said driving and driven members, a stationary member adjacent the space between said portions of the driving and driven members and having an opening therein at a position aligned with the arcuate path defined by said gripping surfaces during movements of the driving and driven members, said opening providing a passage through which the intermediate driving element enters into driving position between the gripping surfaces of the driving and driven members, a gate mounted for angular movement relative to said stationary member to and from a covering position with respect to said opening, cam means for moving the gate out of covering position in timed relationship to the rotation of one of said members, yielding means for moving the gate into covering position, and means for diverting the intermediate driving element from between the gripping surfaces of the driving and driven members at a position displaced from said opening.

2. A fractional revolution clutch as defined in claim 1, the movement of the gate into and out of covering position being longitudinal to the axis of rotation of the driving and driven members.

3. A fractional revolution clutch as defined in claim 1, and wherein said yielding means comprises a leaf spring, the gate comprises a flat shank and a hook extending from one end of the shank transversely to the general plane thereof so as to be adapted to occupy a covering position with respect to said opening, the stationary member having a recess therein for receiving the flat spring and the gate shank.

4. A fractional revolution clutch as defined in claim 1, and wherein said yielding means comprises a leaf spring, the gate comprises a flat shank and a hook extending from one end of the shank transversely to the general plane thereof so as to be adapted to occupy a covering position with respect to said opening, the stationary member having a recess extending radially with respect to the axis of rotation of the driving and driven members, and receiving the leaf spring at its bottom and the gate shank on top of the spring, and the cam means being on the radially outer portions of the driving member.

5. A fractional revolution clutch as defined in claim 1, and wherein the yielding means comprises a leaf spring, the gate comprises a flat shank and a hook extending from one end of the shank transversely to the general plan thereof so as normally to occupy a covering position with respect to said opening, the stationary member having a recess extending radially with respect to the axis of rotation of the driving and driven members, and receiving the leaf spring at its bottom and the gate shank on top of the spring, the bottom of the recess in the stationary member having a projection extending into the radially inner ends of the gate shank and the spring to hold them against radial movement and to provide a swinging mounting for the gate.

References Cited in the file of this patent

UNITED STATES PATENTS

| Number | Name | Date |
|---|---|---|
| 879,016 | Starr | Feb. 11, 1908 |
| 997,585 | Stanley | July 11, 1911 |
| 1,164,627 | Bailey | Dec. 21, 1915 |
| 1,232,244 | Dick | July 3, 1917 |
| 2,556,010 | Swanson | May 23, 1939 |

FOREIGN PATENTS

| Number | Country | Date |
|---|---|---|
| 87,642 | Germany | July 22, 1896 |
| 95,776 | Sweden | May 23, 1939 |
| 669,893 | France | Nov. 21, 1929 |